COIN TELEPHONE CONTROL APPARATUS

Filed Sept. 18, 1962 2 Sheets-Sheet 1

INVENTORS: E. R. ANDREGG
L. A. STROMMEN

BY E J Oluder

ATTORNEY

INVENTORS E. R. ANDREGG
L. A. STROMMEN
BY E J Oliveder
ATTORNEY

United States Patent Office 3,170,039

Patented Feb. 16, 1965

3,170,039

COIN TELEPHONE CONTROL APPARATUS

Ernest R. Andregg and Lawrence A. Strommen, Indianapolis, Ind., assignors to Bell Telephone Laboratories, Incorporated, New York, N.Y., a corporation of New York Filed Sept. 18, 1962, Ser. No. 224,353

10 Claims. (Cl. 179—6.3)

This invention relates to coin operated telephones and more particularly to the control apparatus employed in such instruments. Its general object is to improve coin telephones in both flexibility and reliability.

Conventional coin telephones are designed to provide for some standard initial deposit rate, such as ten cents, for example, so that upon the deposit of the initial rate, the customer may be made aware by the receipt of dial tone that a call may be initiated and so that the dial may be readied for outpulsing. Telephone operating companies and areas within the territory of a single company may differ as to their initial rate requirements. Consequently, there is a need for a method by which the initial rate of a coin telephone may be changed in the field without recourse to complex disassembly or interchange of parts.

There are two principal aspects to the problem of withholding coin telephone service until the deposit of an initial rate. One aspect lies in the means employed to measure the initial rate, which means should, ideally, be readily adjustable as indicated above. The second aspect resides in the specific means employed to enable the telephone speech network and dial pulse contacts once the initial rate has been deposited. These latter means must of course be in some way responsive to the deposit measuring apparatus. Typical prior art arrangements employ one or more separate relays for the telephone enabling function and others additionally utilize an extra set of contacts on the coin relay which tends to complicate the control circuitry and restricts its operation to one particular initial rate.

Any modification to the station apparatus of coin telephones raises the problem of compatibility with the corresponding central office control arrangements. For example, most central offices are designed to supply a negative polarity start signal for coin telephone operation. Compatibility with a negative start signal for a circuit embodying desirable features of initial rate control and full protection against fraudulent operation is known to require the employment of some form of logic circuitry of considerable complexity. A number of central offices, however, are equipped to furnish a positive start signal for coin telephone control and offices not so equipped can be readily modified at a modest cost. Accordingly, a positive start coin telephone control circuit is fully acceptable provided that the advantages of its features outweigh the cost of central office modifications.

Accordingly, a specific object of the invention is to avoid the complex disassembly and interchange of parts involved in changing the initial rate of a coin telephone.

Another object of the invention is to reduce the number of circuit components required in coin telephone control apparatus.

A further object is to reduce the cost of coin telephone control apparatus to the point at which the utilization of positive start circuitry is economical.

An additional object of the invention is to increase the protection afforded by coin telephone control apparatus against fraudulent operation.

These and other objects are achieved in accordance with the principles of the invention by coin telephone control apparatus comprising a totalizer mechanism and electronic control circuitry compatible with a central office positive start signal. Key contacts in the control circuitry are operated by cams carried by a rotatable shaft in the totalizer mechanism. The shaft rotates in the forward direction, in response to the deposit of a coin, through an angle indicative of the value of the coin. Rotation of the shaft through an angle indicative of the deposit of a coin or coins having a total value equal to some preselected initial rate rotates a unique initial rate setting cam to the point at which the cam operates contacts to open a shorting path around the telephone dial pulse contacts, thus readying the dial for operation.

In effect, the totalizer shaft stores coin deposit information as it rotates. The reading out of this stored information is accomplished by resetting the shaft to its normal or index position. This resetting function is performed by a stepping motor which is arranged to drive a ratchet wheel mounted on the totalizer shaft. With the reverse rotation of the totalizer shaft and of the rate setting cam in the performance of the resetting or read out function, the lobe of the rate cam rotates away from the dial shorting contacts. The invention, however, provides a spring-loaded latch which is arranged to latch up the dial shorting contacts after they have once operated. Accordingly, when the totalizer shaft has been returned to its normal or index position the contacts which open the dial shorting path remain operated and the dial remains ready for use.

The invention also provides a means for resetting the rate contact latch when it is desired to return the totalizer mechanism to its initial predeposit or dial-shorted condition. Specifically, a reset electromagnet is arranged in series-circuit relation with the coin relay. The coin relay is conventionally employed to operate the coin hopper vane which finally determines whether deposited coins are collected or returned to the customer. Thus, in an arrangement in accordance with the invention, current from the central office to operate the coin relay also operates the reset electromagnet, the rate setting contact latch is removed from under the rate setting contacts by the armature of the reset electromagnet and thus the totalizer is returned to the dial shorted condition.

Another aspect of the invention relates to the configuration of the rate cam and to its relation with the stepping or resetting ratchet wheel. The rate setting cam has a pair of diametrically opposed outrigger arms or extensions, the ends of which are designed to be secured between respective pairs of teeth on the ratchet wheel. The rate setting cam proper is designed to have a snug friction fit on the totalizer shaft and its exact position is determined by the positioning of the outrigger arms between the teeth of the ratchet wheel. This arrangement has two distinct advantages in that it provides for setting the rotational position of the rate setting cam precisely with respect to the teeth of the resetting rachet wheel and also this rotaional position may be readily shifted simply by disengaging the arms of the rate setting cam, rotating the cam with respect to the totalizer shaft and then reengaging the arms with the teeth of the ratchet wheel. Thus, a change in the initial rate may be accomplished in accordance with the invention with assured accuracy and through a relatively wide range without disassembly or interchange of parts.

Accordingly, one feature of the invention pertains to a latching mechanism which maintains dial unshorting contacts in an operated condition after the return of the coin telephone totalizer shaft to its normal position.

Another feature of the invention resides in a means operatively associated with a coin telephone coin relay for restoring the rate contact latching mechanism to its unoperated condition.

A further feature involves an initial rate setting cam which may be adjusted readily and precisely to change the initial deposit rate setting of a coin operated telephone.

Another feature is the incorporation of the foregoing features in coin telephone control apparatus which is cooperatively associated with a positive start control circuit without resort to complex logic circuitry.

The principles of the invention, together with additional objects and features thereof will be fully apprehended from a consideration of the following detailed description of an illustrative embodiment of the invention and from the appended drawing, in which.

TOTALIZER STRUCTURE

Figures 1, 2, 3, 4, 5, 6:
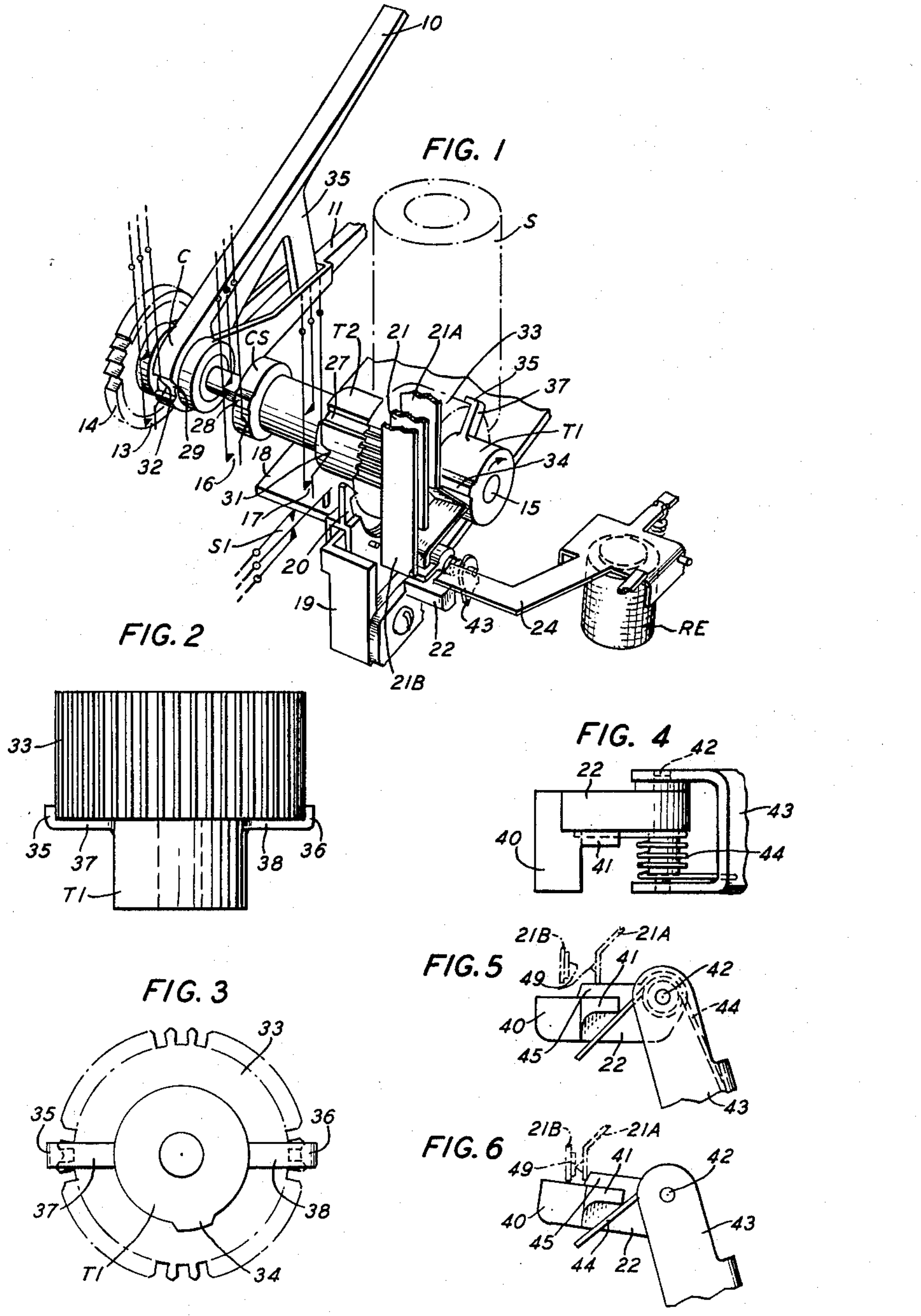
FIG. 1 is a perspective view of coin telephone totalizer apparatus in accordance with the invention.
FIG. 2 is a side view of the rate setting cam and ratchet wheel shown in FIG. 1.
FIG. 3 is a plan view of the rate setting cam and ratchet wheel shown in FIG. 1.
FIG. 4 is a plan view of the rate contact latching mechanism shown in FIG. 1.
FIG. 5 is a side view of the rate contact latching mechanism in the unoperated condition.
FIG. 6 is a side view of the rate contact latching mechanism in the operated condition.
Figure 7:
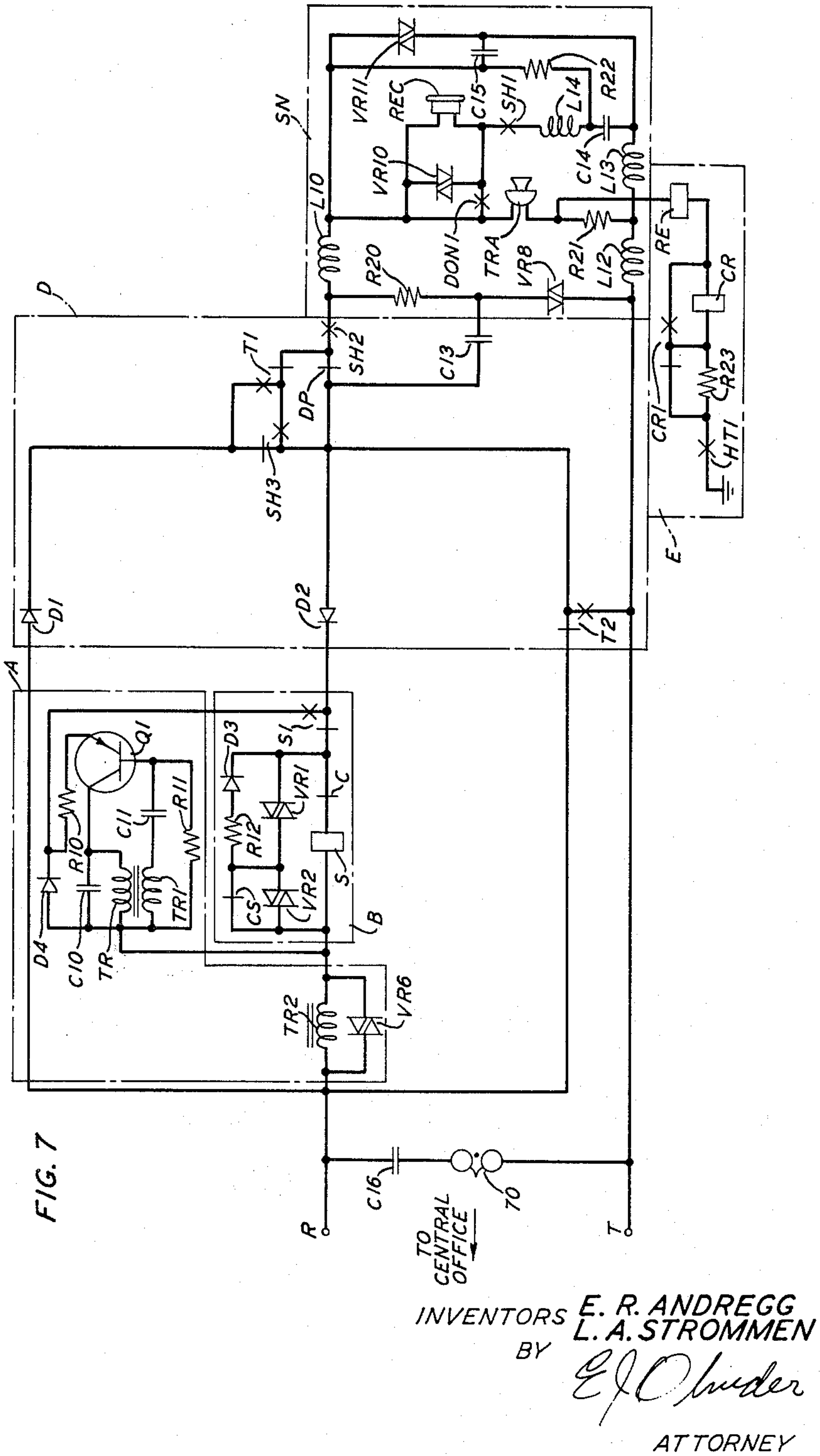
FIG. 7 is a schematic circuit diagram of the control circuitry associated with the totalizer of FIG. 1.

The totalizer structure shown in FIG. 1 comprises totalizer shaft 15 and cams C, CS, T2 and T1 mounted thereon. Shaft 15 is rotated by the cooperative action of coin arms 10 and 11 and ratchet wheel 14. Coin arms 10 and 11 which are mounted for free rotation on shaft 15 protrude into a coin chute (not shown). Coins in the channels of the coin chute are directed to impinge against the upper surfaces of coin arm 10, in the case of quarters, and against coin arm 11, in the case of nickels or dimes, thus driving the coin arms downwardly. Any rotation of coin arm 11 causes coin arm 10 to rotate also by bearing downwardly on connecting bar 35. Coin arm 10 pivots on shaft 15 independently of coin arm 11, however. The rotation of coin arm 10 is translated by means of a drive spring, not shown, affixed to coin arm 10, into a rotational movement of ratchet wheel 14 which in turn rotates shaft 15. Such coin arms in combination with a ratchet wheel totalizer shaft driver are described in detail in patent application Serial No. 206,265, filed June 29, 1962, by D. W. Peat and L. A. Strommen.

The hub of coin arm 10 forms a cam C with a camming notch 29. Rotation of coin arm 10 raises contact spring 32 out of notch 29 to operate contacts 13. The operation of contacts 13 is employed to disable electrically stepping motor S which is used to drive totalizer shaft 15 in the opposite direction during read out. Any possibility of locking or jamming the totalizer mechanism by having the coin arms drive the shaft 15 in one direction with the stepping motor operating to drive shaft 15 in the opposite direction is thereby eliminated.

Cam CS, mounted on shaft 15, includes cam lobe 28 which operates contacts 16. Owing to the combination of an internal key (not shown) on cam CS and an oversized keyway (not shown) on shaft 15, shaft 15 is free to rotate through an arc of approximately 20 degrees before engaging cam CS. At the end of approximately 20 degrees of counterclockwise rotation, shaft 15 engages cam CS and contact spring 30 is lifted by cam lobe 28 to operate contacts 16. The totalizer shaft driving arrangement comprised of coin arms 10 and 11 and ratchet wheel 14 is designed to drive shaft 15 through an arc of approximately 10 degrees for each nickel deposited. Accordingly, neither the deposit of a nickel nor the deposit of a dime operates cam CS. The deposit of a quarter, however, rotates shaft 15 through an angle of approximately 50 degrees, rotating cam CS and operating contacts 16. Contacts 16 are employed in the control circuitry in a manner described in detail below to provide for the generation of coin identification signals at a relatively slow rate in the case of dimes and at a relatively fast rate in the case of quarters.

Cam T2 which may be integral with or fixedly mounted on shaft 15 includes a camming notch 27. When shaft 15 is in the so-called "normal position," that is to say the shaft position before the coin arm mechanism or after the stepping or read out mechanism has operated, contact spring 31 of contacts 17 is engaged by notch 27. In the off-normal condition, however, contact spring 31 is shifted to the high portion of cam T2 and contacts 17 operate in the control circuitry to short the telephone set and to introduce stepping motor S into the circuit. Thus when cam T2 is in the normal position stepping motor S is shorted by T2 cam contacts 17 and the telephone set is returned to the circuit.

Read out of the coin deposit information which is stored by totalizer shaft 15 in terms of its rotational position, is accomplished by driving ratchet wheel 33 in incremental steps of 10 degrees in the direction shown by the small arrow on shaft 15 until shaft 15 has returned to the normal position. The stepping of ratchet wheel 33 is accomplished through the action of armature 18 of stepping motor S. Armature 18 actuates toggle 20 through connecting link 19 and toggle 20 is arranged to engage the teeth of ratchet wheel 33 in driving relation. Self-interrupting contacts S1, operated by armature 18, control the stepping action of stepping motor S. A substantially similar coin telephone totalizer stepping mechanism is described in detail in patent application Serial No. 209,134, filed July 11, 1962, by D. W. Peat, L. A. Strommen and R. K. Thompson, Jr.

Cam T1 which includes cam lobe 34 is also referred to as the initial rate setting cam in that it must be rotated by shaft 15 through an angle that corresponds to the preselected value of an initial rate before its lobe 34 engages contact spring 21A. Contact spring 21A is urged outwardly toward contact spring 21B, thus operating make contacts 49, shown in FIG. 6. The travel of contact spring 21B away from contact support member 21 opens a set of break contacts (not shown) to open a shorting path around the dial pulse contacts of the telephone. This sequence is described in detail below under the heading OPERATION.

FIG. 4 shows a rate setting contact latch mechanism comprising a yoke 43 supporting a shaft 42, a latch 22, pivotally mounted on shaft 42, an arm 40, and a lip 41. In its unoperated position, shown in FIG. 5, latch 22 is spring loaded against contact spring 21A by spring 44 which has one end bearing against yoke 43 and the other end bearing against lip 41. As spring 21A is engaged by cam lobe 34, the end of spring 21A is forced off ledge 45, permitting latch 22 to rotate upwardly until both contact springs 21A and 21B are bearing against arm 40, as shown in FIG. 6. Contacts 49 remain latched as described when cam T1 is rotated back to the normal position by the action of the stepping mechanism. Accordingly, the dial pulse contacts remain unshorted and ready for outpulsing.

At the completion of a call it is necessary to return latch 22 to its unoperated position, as shown in FIG. 4. This step is accomplished by reset relay RE and its armature 24. When current is supplied to reset relay RE, by means described in detail below under the heading OPERATION, armature 24 strikes arm 40 of latch 22, forcing it downwardly, allowing contact spring 21A to move from arm 40 to ledge 45, thus opening contacts 49. As a consequence break contacts (not shown) carried by contact spring 21B and contact support 21 are allowed to close.

In accordance with the invention cam T1, as shown in details in FIGS. 2 and 3, is uniquely constructed. A pair of diametrically opposed outrigger members or arms 37 and 38 terminate, respectively, in tabs 35 and 36 which are fitted into accommodating notches between the teeth of ratchet wheel 33. To change the rotational position of cam T1, tabs 35 and 36 are disengaged from the teeth of ratchet wheel 33 and cam T1 is rotated with respect to shaft 15 until the desired position is reached. The corresponding change in initial rate is measured directly by the angular shift in position, the angle subtended by the distance between adjacent teeth on wheel 33 being equal to a five cent change.

CIRCUIT CONFIGURATION

In FIG. 4 the circuitry associated with the totalizer mechanism is illustrated by conventional detached contact notation in which an "X" denotes a make contact and a bar "—" indicates a break contact. To assist in correlating the description of the totalizer mechanism with the description of the associated circuitry, contacts in FIG. 4 operated by the totalizer cams are identified by the corresponding cam designations rather than the contact designations employed in FIG. 1. The circuit shown in FIG. 4 may be classified broadly in terms of sub-circuits which include an oscillator circuit A, a coin identification signal speed control circuit B, a telephone speech network SN, an operating control circuit D and a coin relay and reset relay circuit E. Oscillator circuit A, which generates tone pulse coin identification signals, employs a transistor Q1 with conventional collector-to-base coupling provided by transformer coils TR and TR1 and capacitor C11. Oscillator A also includes frequency determining capacitor C10 and biasing resistors R10 and R11. Diode D4, bridged between ring lead R and one terminal of emitter-biasing resistor R10 establishes a fixed reference voltage for oscillator A and also provides a holding path for central office supervisory circuits. Oscillator output is applied to ring lead R by additional transformer winding TR2 shunted by a click suppressor varistor VR6.

The coin identification signal speed control circuit B includes the coil of stepping motor S which is in series with ring lead R. The rate at which stepping motor S operates is determined by the reference voltage across it which in turn is established by the magnitude of the shunting impedance. For low speed action employed to signal the deposit of a nickel or a dime, the impedance shunting stepping motor S results from the series combination of resistor R12 and diode D3 in parallel with varistor VR1. With the deposit of a quarter, however, break contacts CS operate, as explained above, opening the shunt path around varistor VR2. The higher impedance across stepping motor S, resulting from the addition of varistor VR2 to the combination of varistor VR1, resistor R12 and diode D3, raises the voltage across stepping motor S which increases the stepping and signaling rate. Break and make contacts S1, operated by armature 18 of stepping motor S, interrupt the flow of current to the stepping motor and to oscillator A, respectively, thus providing for the stepping action of the motor and the pulsing action of the oscillator. The function of the components of speed control circuit B is explained in further detail below under the heading OPERATION.

Telephone speech network SN is coupled to ring lead R through switchhook make contact SH2 and inductor L10 and to tip lead T through inductor L12. Speech network SN is wholly conventional and is included herein merely to ensure completeness of disclosure. The upper terminal of transmitter TRA is extended directly to ring lead R and the lower terminal is extended to tip lead T through resistor R21. Receiver REC is similarly bridged between ring lead R and tip lead T through switchhook contact SH1, inductor L14, and capacitor C14. Other elements in speech network C include dial off-normal contact DON1, resistor R22, capacitor C15, and varistors VR10 and VR11.

Control and logic circuit D include diodes D1 and D2 which provide the logic necessary to detect current reversal in ring lead R when dial tone is applied to the line. Diode D1 provides a shunting path around oscillator A and speed control circuit B for positive current on ring lead R. Negative current on the ring lead is permitted to flow through stepping motor S by diode D2. A shorting path around dial pulse contacts DP is provided through break contact T1 and make contact SH3. Break contact SH3, in its unoperated condition, completes a shorting path around make contact T1. Capacitor C13 provides contact protection for dial pulse contacts DP. Break contact T2 opens a shorting path around stepping motor S, thus readying stepping motor S for operation. Make contact T2 completes a path between ring lead R and tip lead T which shorts out telephone speech network SN.

Coin relay and reset relay circuit E provides a path to ground from tip lead T whenever hopper trigger contact HT1 is operated. This path may be traced from ground through hopper trigger contact HT1, resistor R23, coin relay CR, reset relay RE, and resistor R21. Ground is of course also extended through this path to speech network SN and additionally may be applied to ring lead R through make contact T2. Contacts CR1 are provided to by-pass coin relay CR when it operates and to insert resistor R23 into the line to limit coin relay operating current.

A conventional ringer circuit RN including ringer 70 in series with capacitor C16 is bridged across the line between ring lead R and tip lead T.

OPERATION

While the coin telephone is idle, the central office monitors the line by connecting positive battery between ring lead R and ground with tip lead T left open. When the customer removes the handset (not shown) switchhook contacts SH1 operate to complete a path placing receiver REC across the line. Switchhook contacts SH2 operate to complete a path between ring lead R and speech network SN. Break contact SH3 opens a shorting path across rate contacts T1 and make contact SH3 completes a shorting path around dial pulse contacts DP.

With the deposit of any coin, shaft 15 and cam T2 of the totalizer (FIG. 1) rotate off-normal, operating contacts T2. Break contact T2 opens a shorting path around stepping relay S and make contact T2 completes a shorting path across telephone speech network SN.

If the deposit of the first coin does not equal the preselected initial rate, contacts T1 do not transfer and accordingly stepping motor S does not operate and dial pulse contacts DP remain shorted. The coin falling into the hopper (not shown) trips hopper trigger contact HT1 which provides continuity between speech network SN and ground over the path previously described. When the initial rate has been deposited, rate contacts T1 are operated and latched in the operated condition, as previously described. The operation of break contact T1 unshorts dial pulse contact DP, readying the dial for outpulsing. The operation of break contact T1 closes a path from ring lead R to ground through diode D1, make contact T1, make contact SH3, make contact T2, inductor L12, resistor R21, and thence to ground through the elements of coin relay and reset relay circuit E.

The current flow described is recognized by the central office as a start and at this point the central office conventionally applies negative battery to ring lead R and grounds tip lead T, causing loop current to flow in the direction to operate stepping motor S which resets the totalizer to the normal position, as described above. When the totalizer is back in the normal position, speech network SN of the telephone set is unshorted by the release of make contact T2 and the customer hears dial tone. Contacts T1 having been latched in the operated position, as described, do not interfere with dialing at this time. When the call is terminated, the central office conventionally applies a coin pulse to tip lead T. The consequent current flow to ground through the coin relay and reset relay circuit E operates reset relay RE which serves to unlatch contacts T1. Additionally, coin relay CR is operated to collect or refund coins held in the coin hopper.

COIN SIGNAL GENERATION

As explained above, the resetting of the totalizer is accomplished by stepping motor S which is permitted to operate through its pulsing break contact S1, driven by armature 18 (FIG. 1). With the alternate transfer of make and break contacts S1, pulsed energy is also applied to operate oscillator A as the totalizer is reset to normal. With the deposit of a nickel or a dime, break contact CS remains unoperated and the voltage across stepping motor S is established by the shunting impedance of the parallel circuit comprising varistor VR1, resistor R12 and diode D3. With the deposit of a quarter, break contact CS operates in the manner indicated above, the shunt path around varistor VR3 is opened and the impedance and consequently the voltage across stepping motor S is increased. With stepping motor S cycling five times for the read out of a deposited quarter, five coin identifying pulses are generated at the high speed rate which may be on the order of 15 to 18 pulses per second. A corresponding illustrative rate for the low speed pulses is on the order of 5 to 7 pulses per second.

Varistors VR1 and VR2 have symmetrical bidirectional properties and in one direction the voltage drop across varistor VR1 or across varistors VR1 and VR2 controls the current flowing through stepping motor S and hence the speed at which the stepping motor S operates. When contacts S1 transfer, opening the current path of stepping motor S at break contact S1, current tends to continue to flow through stepping motor S in the same direction. With the supply path open, however, current travels back around through varistor VR1 or through varistors VR1 and VR2 in the opposite direction and it is this current that regulates the release time of the armature of stepping motor S. It is this feature of the invention that permits the pulsing rate to be changed without changing the pulse duty cycle. Stated otherwise, in the high speed condition the armature of stepping motor S operates faster and also releases faster than in the low speed condition so that the signal pulse duty cycle remains substantially constant. In accordance with the principles of the invention a symmetrical varistor combination is employed in lieu of a diode for the reason that although a diode may have the proper voltage drop in the direction that controls stepping motor armature operate time, it would not necessarily have the same resistance in the direction that controls armature release time.

*Incoming call*

When the coin telephone is called from another station, the answering party can trip ringing and talk because the totalizer is left in the normal position after any preceding call. On incoming collect calls, the call may be routed to an operator's position in order to monitor transient coin signals. The operator's position may then apply negative battery to ring lead R with tip lead T grounded, causing the totalizer to be read out immediately following any deposit.

*Abandoned call*

When a customer abandons a call, after having deposited a coin, switchhook contact SH3, unoperated, shorts out make contact T1, causing the central office to find ring lead R grounded through diode D1, switchhook contact SH3, make contact T2, inductor L2, resistor R21, and the coin relay reset relay circuit E. The central office accordingly detects a start and applies negative dialing battery, which permits stepping relay S to reset the totalizer. As soon as the totalizer is returned to the normal position, the central office finds contact SH2 opened and accordingly will disconnect and apply coin refund potential to tip lead T. With this type of operation, the central office will restore the totalizer to the normal operating condition and refund any deposit on an incompleted abandoned call regardless of when the deposit was made.

*Automatic overtime*

After a predetermined time, the initial rate may be collected to operate hopper trigger contact HT1 and notify the customer that an overtime deposit is required. Upon receiving an overtime deposit, the totalizer moves off-normal and is immediately stepped back irrespective of the value of the initial rate because negative talking battery is present on the line. Shortly thereafter, the central office may check for a ground path through hopper trigger contact HT1 which will of course be closed again if a coin has been deposited.

*False ground protection*

As previously described, false ground protection is accomplished by shorting out dial pulse contacts DP by means of the shorting path which includes break contact T1. If the customer applies a false ground, the central office will recognize a start signal and bring in dial tone and battery. Nevertheless, dial pulse contacts DP remain shorted, thus preventing a free call. This arrangement is in contrast to certain prior art coin telephone control circuits which employ a second hopper trigger contact on the coin relay as a dial-shorting contact. Such an arrangement provides false ground control for the first-nickel deposit only. In accordance with the invention as described, however, false ground protection is achieved without regard to the particular initial rate and without introducing any other possibilities of achieving electrical fraud such as by manipulation of the switchhook, manipulation of the dial pulse contacts or by dropping coins in at particularly select times.

It is to be understood that the embodiment described herein is merely illustrative of the principles of the invention. A wide variety of modifications may be devised by persons skilled in the art without departing from the spirit and scope of the invention.

What is claimed is:

1. A coin operated telephone comprising, in combination, totalizer apparatus including first, second, and third cams driven by a totalizer shaft, first, second, and third sets of contacts each operatively responsive to the rotation of a respective one of said cams through a preselected angle of rotation, said telephone including dial pulse generating means and a speech network, first means responsive to the deposit of a coin for rotating said shaft from a normal or index position through an angle indicative of the value of the deposited coin, second means for rotating said shaft in discrete incremental steps back to said normal position, each of said steps corresponding in magnitude to the value of a minimum deposit coin, means including a fourth cam mounted for free rotation on said shaft responsive to the deposit of a coin for momentarily disabling said second rotating means thereby to preclude the simultaneous application of opposing rotational forces to said shaft by said first and second means, means including said first cam and said first contacts responsive to the rotation of said shaft to an off-normal position for enabling said second rotating means and for shorting out said speech network, means including said second cam and said second contacts responsive to the rotation of said shaft through an angle indicative of the deposit of coins equal in value to a preselected initial rate for unshorting said dial pulse generating means, means responsive to the operation of said second contacts for latching said contacts in an operated position, means responsive to the operation of said second rotating means for generating tone pulse signals indicative of each deposited coin in terms of the number of said pulses, means including said third cam and said third contacts responsive to the rotation of said shaft by said first rotating means through an angle indicative of the deposit of a coin of preselected value for modifying the repetition rate of said tone pulses, and means responsive to the application of a coin return pulse for unlatching said second contacts, whereby said dial pulse generating means remain unshorted after the return of said totalizer to said normal position until the application of a coin return signal.

2. Apparatus in accordance with claim 1 wherein said latching means comprises a pivotally mounted arm member having a raised area, a recessed area and a shoulder surface area therebetween, contact springs supporting said second contacts, said arm member being spring loaded against the ends of said contact spring, said raised area bearing against the ends of said contact springs when said second contacts are in the unoperated position, whereby upon the operation of said contacts said contact springs are disengaged from said raised area permitting said arm member to pivot inwardly toward said contact springs, said contact springs then being prevented from returning to the unoperated position by said shoulder area.

3. Apparatus in accordance with claim 1 wherein said second means includes a ratchet wheel mounted on said shaft, said wheel having teeth around the outer periphery thereof, adjacent ones of said teeth being separated by a distance subtending an angle equal to the angular movement of said shaft in response to a minimum deposit coin, said second cam being mounted by a friction fit on said shaft adjacent to said wheel, said second cam including a cam lobe and a pair of diametrically opposed integral tab members each removably engaged between respective pairs of said teeth, whereby said initial rate may be changed by minimum deposit increments by disengaging said tabs from said wheel, rotating said wheel with respect to said shaft and reengaging said tabs with said wheel.

4. Coin telephone control apparatus, compatible with a central office positive start potential, said apparatus comprising, in combination, means responsive to the deposit of a coin for storing indicia of the value of said coins, means responsive to the deposit of a coin or coins equal in value to a preselected initial rate for removing said indicia from said storing means, means responsive to said indicia removing means for generating tone pulse signals for transmission to said central office indicative of the value of deposited coins in terms of the number of pulses and in terms of pulse repetition rate, said coin telephone including dial pulse generating means, means responsive to the inception of operation of said indicia removing means for enabling said dial pulse generating means, means responsive to the operation of said enabling means for maintaining said enabling means in the operated condition after the removal of said indicia from said storing means, means responsive to a signal from said central office for disabling said enabling maintaining means, whereupon said dial pulse generating means are disabled, and means for selectively changing the value of said preselected initial rate in precise incremental steps, each of said steps being indicative of the value of a minimal deposit coin.

5. Apparatus in accordance with claim 4 wherein said storing means comprises a totalizer mechanism having a rotatable shaft with contact operating cams mounted thereon, said shaft and said cams being rotatably responsive in a forward direction to the deposit of coins, said indicia removing means including a ratchet wheel having teeth on the outer periphery thereof mounted on said shaft and means for engaging said wheel thereby to rotate said shaft in a reverse direction in discrete steps, each of said discrete steps corresponding in magnitude to one of said incremental steps, and one of said cams being an initial rate setting cam having a camming lobe disposed to operate a set of contacts to disable electrically said dial pulse generating means after said one cam is rotated through an angle corresponding to said initial rate, said one cam including at least one integral member removably engaged between first adjacent ones of said teeth, whereby said member may be readily disengaged, said one cam may be rotated with respect to said shaft and with respect to said wheel and said member may be reengaged between second adjacent ones of said teeth, thereby changing the value of said initial rate by an amount corresponding to the number of teeth between said first and second teeth.

6. Apparatus in accordance with claim 5 wherein said contacts are mounted on contact springs, said enabling maintaining means comprising a latch member spring loaded against the ends of said contact springs, said latch member being automatically operable to maintain said contacts in the operated position once said contacts are operated by said camming lobe, and said disabling means comprising a relay having an armature positioned to engage said latch upon the operation of said relay thereby to disengage said contact springs from said latch member, permitting said contacts to return to the unoperated condition.

7. Coin telephone control apparatus comprising, in combination, a totalizer mechanism including a shaft rotatably responsive to the deposit of coins, control circuitry, including ring and tip leads, responsive to a positive starting potential, said telephone including dial pulse contacts in said ring lead and a speech network bridged between said ring and tip leads, a first conducting path including initial rate control contacts normally shorting said dial pulse contacts, a rate setting cam responsive to the rotation of said shaft through an angle indictaive of the deposit of a preselected initial rate for opening said rate control contacts thereby to unshort said dial pulse contacts, means for applying ground potential to said tip lead including a second conducting path with a hopper trigger contact, a coin relay and a reset relay in series relation therein, means for rotating said shaft and said rate setting cam back to a normal or index position after the opening of said rate control contacts, means responsive to the opening of said rate control contacts for maintaining said contacts in the open position irrespective of the subsequent operation of said rotating means, and means including said reset relay responsive to current flow in said second conducting path for disabling said maintaining means.

8. Apparatus in accordance with claim 7 wherein said maintaining means comprises a spring loaded contact latching mechanism and wherein said disabling means includes the armature of said reset relay.

9. Coin operated telephone control circuitry comprising ring and tip leads connectable to a telephone line, a totalizer mechanism including a shaft rotatably responsive to the deposit of coins, means including a stepping relay for reversing the rotation of said shaft, said stepping relay being in series relation with said ring lead, a tone pulse coin identification signal generating network shunting said relay, a coin identification pulse repetition rate control circuit shunting said relay, a first diode in series relation with said relay, and a conducting path including a second diode oppositely poled to said first diode, said path shunting said relay and said first diode thereby permitting selective operation of said stepping relay by the polarity of current applied to said ring lead.

10. Coin telephone control apparatus comprising, in combination, a totalizer mechanism including a shaft rotably responsive to the deposit of a coin in said telephone, means including a toothed ratchet wheel mounted on said shaft for rotating said shaft back to a normal position, means including an initial rate setting cam and a set of contacts operatively responsive to said cam for enabling said telephone for dial outpulsing after the deposit of a preselected initial rate, said cam being mounted on said shaft adjacent to said wheel, the rotational position of said cam with respect to said shaft being determinative of said rate, and means integral with said cam removably engaged with the teeth of said wheel thereby to fix the rotational position of said cam with respect to said shaft, whereby said initial rate may be readily changed by disengaging said integral means from said teeth, rotating said cam with respect to said wheel and with respect to said shaft and reengaging said integral means with said teeth.

References Cited in the file of this patent

UNITED STATES PATENTS

| | | |
|---|---|---|
| 2,883,463 | Goodale et al | Apr. 21, 1959 |
| 2,929,479 | Pferd | Mar. 22, 1960 |
| 2,977,419 | Goodale et al. | Mar. 28, 1961 |
| 3,086,081 | Cath et al. | Apr. 16, 1963 |